No. 709,366. Patented Sept. 16, 1902.
E. H. SEXTON.
SPLIT COLLAR.
(Application filed Jan. 21, 1902.)
(No Model.)
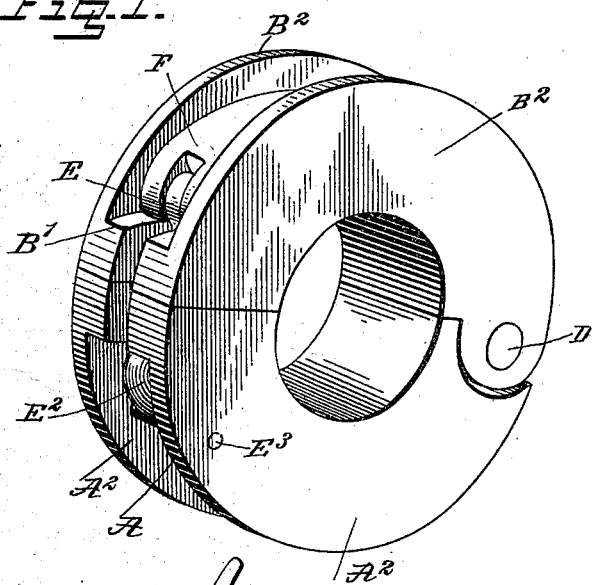
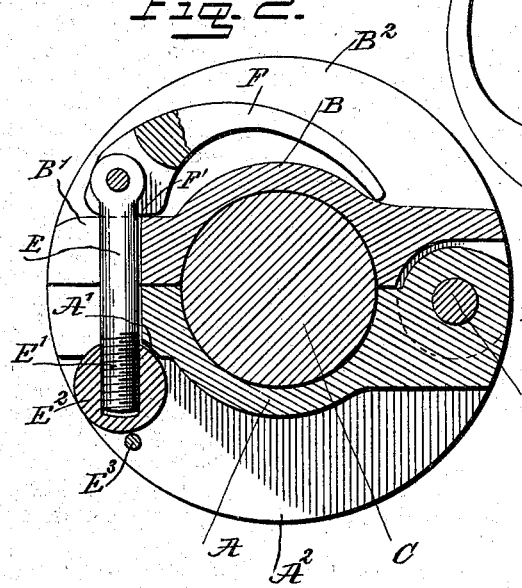
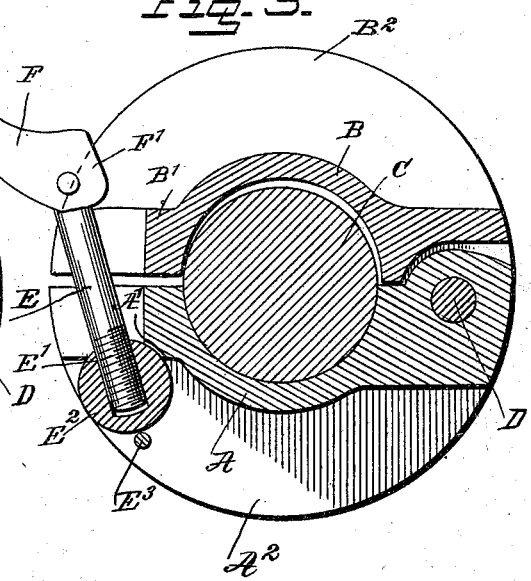
WITNESSES:
James T. Duhamel.
Rev. G. Hostir.
INVENTOR
Ernest H. Sexton
BY
ATTORNEYS

UNITED STATES PATENT OFFICE.

ERNEST HENRY SEXTON, OF SANDYHILL, NEW YORK.

SPLIT COLLAR.

SPECIFICATION forming part of Letters Patent No. 709,366, dated September 16, 1902.

Application filed January 21, 1902. Serial No. 90,619. (No model.)

*To all whom it may concern:*

Be it known that I, ERNEST HENRY SEXTON, a citizen of the United States, and a resident of Sandyhill, in the county of Washington and State of New York, have invented a new and Improved Split Collar, of which the following is a full, clear, and exact description.

The object of the invention is to provide a new and improved split collar which is simple and durable in construction and readily applied to and securely locked in place on a shaft or other revolving part.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a perspective view of the improvement. Fig. 2 is a cross-section of the same as applied with the parts in a locked position, and Fig. 3 is a like view of the same with the parts in an unlocked position.

The split collar consists, essentially, of the members A and B, having semicircular bores or recesses, the walls of which securely and firmly engage the peripheral surface of the shaft C or other part on which the collar is to be fastened. The members A and B are connected with each other by a pivot D to allow of opening the collar and placing it in position on the shaft without taking the latter out of its bearings, and on the free end of the member A is pivoted a link E, pivotally connected with a cam-lever F, formed on its fulcrum end with a cam-surface F', adapted to be engaged by a lug B' on the member B, so that when the members A and B are in position on the shaft C, as shown in Fig. 3, and the lever F is swung into the closed position (shown in Fig. 2) then the cam-surface F' presses against the lug B' to cause the link E to exert a pull on the member A, whereby both members are drawn toward each other and in firm contact with the peripheral surface of the shaft C to securely clamp the collar to the shaft. The link E can be lengthened or shortened to insure proper working of the cam-lever F, and for this purpose the link has a threaded end E', screwing in a ball $E^2$, fitting in a socket A' on the outer face of the free end of the member A. A pin $E^3$ is held in the flanges $A^2$ of the member A and engages the outer end of the ball $E^2$ to hold the latter in position in the socket and to allow the ball to turn in any direction. Now when the link E and its cam-lever F are in an open position the said link can be screwed in or out in the ball $E^2$ to bring the cam-surface F' in proper relation to the lug B' to insure secure clamping of the members on the shaft C. The members A and B are formed with the annular flanges $A^2$ $B^2$ for forming a space for the link E and lever F to rest in when the collar is clamped in place, so that no portion of the link and lever projects beyond the peripheral faces of the flanges, and hence form no projections liable to catch workingmen's aprons or other garments, thus rendering the collar perfectly safe for use on shafts extending close to floors, &c. When it is desired to remove the collar, the operator simply swings the cam-lever outward, with the link E as the fulcrum, to disengage the cam-surface F' from the lug B' (see Fig. 3) to allow partial opening of the members, and then the lever, with the link E, is swung outward to allow the members to swing sufficiently to disengage the shaft C. The cam-surface F' has a straight portion, as shown in Fig. 2, to rest flat on the flat top of the lug B' at the time the lever F is in a closed position, so that the lever is not liable to accidentally swing into an open position when the shaft C, and with it the collar, is rotating.

Having thus described my invention, I claim as new and desire to secure by Letters Patent—

1. A split collar, comprising members hinged together one of the members being provided with a recess in its periphery, a link pivotally connected with the free end of one of the members, and a cam-lever fulcrumed on the free end of the link and adapted to engage a surface on the other member and to lie within the recess thereof, as set forth.

2. A split collar, comprising flanged members hinged together, a link pivotally connected with one member and adapted to extend between the flanges of the members, and a cam-lever fulcrumed on the link and adapted to engage a lug on the other member, the said lever when closed extending between the flanges of the member having the said lug, as set forth.

3. A split collar, comprising members hinged together, a link adapted to be lengthened or shortened and having a ball-and-socket connection with the free end of one of the said members, and a cam-lever fulcrumed on the free end of the said link and adapted to engage the free end of the other member, as set forth.

4. A split collar, comprising members hinged together, a ball mounted in a socket in one member and having a screw-threaded socket, a link screwing into the ball, and a cam-lever pivoted to the free end of the link and adapted to engage a lug on the other member, as set forth.

In witness whereof I have signed my name to this specification in the presence of two subscribing witnesses.

ERNEST HENRY SEXTON.

Witnesses:
MONTY H. GIBSON,
AUGUSTUS CARPENTER.